(12) United States Patent
Dukes

(10) Patent No.: US 6,739,661 B1
(45) Date of Patent: May 25, 2004

(54) PIVOTABLE RECLINING CHILD SAFETY CAR SEAT

(76) Inventor: David N. Dukes, 1 Sandpiper Strand, Coronado, CA (US) 92118

( * ) Notice: Subject to any disclaimer, the term of this patent is extended or adjusted under 35 U.S.C. 154(b) by 0 days.

(21) Appl. No.: 10/195,914

(22) Filed: Jul. 15, 2002

(51) Int. Cl.[7] .................................................. B60N 2/26
(52) U.S. Cl. ................ 297/256.13; 297/329; 297/256.1
(58) Field of Search ........................... 297/256.1, 250.1, 297/256.13, 329, 327, 328

(56) References Cited

U.S. PATENT DOCUMENTS

| | | | | |
|---|---|---|---|---|
| 4,915,446 A | * | 4/1990 | Darling et al. | 297/256.14 X |
| 5,462,333 A | * | 10/1995 | Beauvais | 297/256.13 |
| 5,494,331 A | * | 2/1996 | Onishi et al. | 297/256.13 |
| 5,551,751 A | * | 9/1996 | Sedlack et al. | 297/256.13 |

* cited by examiner

Primary Examiner—Anthony D. Barfield
(74) Attorney, Agent, or Firm—Donald W. Meeker

(57) ABSTRACT

A child safety seat pivots between a sitting and reclining position on a base secured by a vehicle safety belt. A pair of pivot arms extending from each side of the safety seat slide in a pair of grooves in each side of the base. The primary pivot arm moves in an essentially horizontal groove to maintain a low center of gravity. A secondary pivot arm stabilizes the safety seat and helps to maintain the safety seat back in close proximity with the vehicle seat back. A high pivot arm near the top of each side of the seat may be positioned in a mating opening or a slotted opening in each side of the base. A motor and reversible drive assembly, which may be remotely controlled can be used to move the safety seat.

10 Claims, 3 Drawing Sheets

PIVOTABLE RECLINING CHILD SAFETY CAR SEAT

BACKGROUND OF THE INVENTION

1. Field of the Invention

The present invention relates to child safety car seats and in particular to a child safety car seat that has a pivotable seat which reclines while maintaining proximity with the vehicle seat back and seat bottom with a low center of gravity for safety.

2. Description of the Prior Art

While riding in cars, children normally wish to remain upright in a seated position to look around or play. But children often fall asleep while riding. In the safety child car seats, now required by law, a child falling asleep in a sitting position usually winds up with his or her head bent over in an uncomfortable position with the child's neck contorted downward and sideways and the child's head often falls forward in a potentially choking position unless the seat is reclined.

Some prior art child car seats are capable of reclining to allow the child to be in a comfortable position while sleeping and still be protected in the child car safety seat. Most prior art reclining seats fail to maintain a safe contact or close proximity to the vehicle seat back and seat bottom throughout the range of positions between an upright position and a reclined position or requires the moving of the child seat base to be somewhat dangling off the edge of the vehicle car seat in order to accommodate room for the child safety seat reclined position against the vehicle seat back.

U.S. Pat. No. 4,205,877, issued Jun. 3, 1980 to Ettridge, puts forth a child's car seat for sitting on the conventional seat of a vehicle and being retained therein by the vehicle safety belts, the car seat being moveable between a slumbering position and a sitting position by movement of a linkage system operated by a handle, whereby the linkage system incorporates an over center device so that the car seat is securely restrained in its two extreme positions.

U.S. Pat. No. 4,545,617, issued Oct. 8, 1985 to Drexler, concerns a safety chair for children adjustable in two positions, giving the child a sitting and a recumbent position, respectively. The seat and the back of the chair are mutually pivotally connected and the seat is adjustably connected to a horizontal base frame part, the back being pivotally connected to upstanding portions of said base frame. Preferably the seat and the base frame are mutually connected by a lever mechanism according to the crank shaft principle. An actuating lever extends sideways from the chair.

U.S. Pat. No. 5,344,213, issued Sep. 6, 1994 to Koyanagi, claims an infant-restraining protective seat including an upper bracket secured to a seat back. In order that a seat back may be locked at any of three reclining angles, three locking holes through which a locking pin is passed are provided in a circular portion of the upper bracket on the circumference of a circle of a prescribed radius from the center of the circular portion. In order to lock the seat back at a folded position, the circular portion is provided with a locking hole, located on the same circumference as the locking through which the locking pin is passed. Each of the locking holes is elliptical in form, with the ellipse having a minor axis and a major axis. In this case, the minor axis is set to have a size that allows the locking pin to be passed through and slid along the hole with almost no gap between the pin and the walls of the hole. The locking holes are so arranged that the minor axis of each hole lies in the circumferential direction of a circle concentric with a hole.

U.S. Pat. No. 3,645,548, issued Feb. 29, 1972 to Briner, is for a child safety auto seat with a frame suspended over the auto seat. Sliding pivotable connections between the seat and the frame allow the seat to be reclined and inclined.

U.S. Pat. No. 5,609,393, issued Mar. 11, 1997 to Meeker, describes a toddler carrier comprising a shell having a seat, back and sides, and a separate base. A rigid link pivotally attaches the lower rear of the shell to one end of the base. An axle connects the lower front of the shell to the other end of the base. The sides of the shell include slots which accept the axle. A spring-biased release handle is located beneath the front of the seat with integral release arms angularly located beneath the seat. The release arms are pivotally connected to the shell at their distal ends and have a plurality of notches which selectively mate with the axle. Any notch may be selected by depressing the release handle and pivoting the shell with a subsequent release of the handle.

U.S. Pat. No. 5,746,478, issued May 5, 1998 to Lumley, discloses a reclining mechanism for a child safety seat used in motor vehicles that enables the safety seat to be used in both a forward and rearward facing position. The reclining mechanism comprises a seat, a base member to which the seat is attached, a connection between the seat and base member that allows movement of the seat with respect to the base. The movement comprises a first range of reclining movement where the seat is able to move between an upright position and a first recline position, and a second range of reclining movement where the seat further moves between the first reclined position and a second reclined position. A stop prevents the seat moving from the first reclined position into the second range of reclining movement. The stop requires manual operation or manipulation of the seat to allow release of the seat into the second range of reclining movement. This allows a minor amount of reclining of the seat while restraining the seat from fully reclining which may be dangerous when in the forward facing position. The fully reclined position is only when the child safety seat is used in a rearward facing position.

U.S. Pat. No. 5,110,182, issued May 5, 1992 to Beauvais, indicates a portable seat especially adapted for use as a baby seat having a portable base with means for releasably attaching the base to the seat of a vehicle and a seat supported by the base, connected between the portable base and the seat by which the seat can move relative to the base in a controlled manner to elevate the front and the rear of the seat in the same action as the seat moves forward such as occurs by inertia upon a sudden deceleration, the entire apparatus being self-contained and portable so that the apparatus can be removed or installed as desired.

U.S. Pat. No. 3,948,556, issued Apr. 6, 1976 to Hyde, illustrates a car seat for a young child which may be oriented in either a sitting or reclining position. The orientation of the car seat can be changed without disturbing the occupant or the secured position of the supporting frame. The car seat includes a seat structure, a support frame and linkage therebetween. The seat structure is designed to enclose the occupant for protection during severe maneuvering and collisions and includes a restrainer positioned across the front of the occupant which advantageously distributes the impact force on the occupant during a collision. The restrainer is held in place by a secondary seat belt system which does not require unbuckling when the seat orientation is changed. The linkage between the seat structure and the support frame provides a high seating position for comfort and visibility and a reclining position for resting.

U.S. Pat. No. 4,342,483, issued Aug. 3, 1982 to Takada, is for a child safety seat for vehicles comprising a molded plastic seat having a bottom, back and protective sides and fitted with a padded cover. The plastic seat is carried on and strengthened by a tubular metal frame which is constructed to support the safety seat on a vehicle seat and to be secured in place by the vehicle seat belt or a special restraint belt. A retractor belt leads rearwardly from an emergency locking retractor fastened to the underside of the seat and joins a pair of shoulder belts which extend divergently and upwardly in back of the seat back, forward over an upper cross piece of the supporting frame and through lateral spaced-apart slots in the seat back and then lead downwardly into a polymeric foam abdominal pad. Portions of the shoulder belts corresponding to the pelvic region of the child are embedded within and united to the abdominal pad and are fastened at their lower ends to the upper portion of a buckle tongue, which portion is also embedded within the abdominal pad. The buckle tongue is releasably received in a buckle affixed on the underside of the front of the seat bottom. Provision is made for adjustment of the effective length of each shoulder strap, and additional slots through the back can be provided for alternative fitting of the shoulder belts in different pairs of slots for improved fitting of the belts to small and large children.

To prevent whiplash and other injury to the child in the safety seat in case of a rear-end collision, the safety seat back should maintain close proximity with the vehicle seat back to minimize movement in case of a rear-end collision and for stability the safety seat should maintain a low center of gravity with close proximity to the vehicle seat bottom.

So, a truly safe child safety seat with all moving parts enclosed as well as a reclining child safety seat which maintains close proximity with the vehicle seat back and bottom would be desirable. The present invention answers those needs.

SUMMARY OF THE INVENTION

An object of the present invention is to provide a child car safety seat which can be adjusted to any position back and forth between an upright sitting position and a reclining sleeping position while maintaining close proximity between the child seat and the vehicle seat back and maintaining a low center of gravity with close proximity to the safety seat base and the vehicle seat bottom without having to move the base of the child seat forward or without having to recline the vehicle seat backwards which will increase stability of the portable child seat relative to the vehicle seat, in case of collision or other hazardous driving motions.

A further object of the present invention is to provide a pivotable reclining child safety seat with all of the moving parts safely housed in a molded plastic shell enclosure not accessible to the child to prevent injury to the child and clogging of the moving works by any blankets, clothing, or toys in the possession of the child.

One more object of the present invention is to provide a pivotable child safety seat on a horizontal sliding pivot arm which can be operated manually or accommodate a motorized version with a motor means, similar to applicant's prior patent applications, to move the pivotable child safety seat between a reclining position and an upright position.

A related object of the present invention is to provide a remote control for automatically and remotely controlling the position of the child car safety seat to adjust it between an upright position and a reclined position.

An additional object of the present invention is to provide a child car safety seat which is attachable to the car seat by means of the car seat belts.

In brief, a portable pivotable child car safety seat has a seat which moves relative to its base on horizontally sliding pivots, preferably pivotable wheels from the seat rolling in grooves in the base, maintaining close proximity with the vehicle seat back and maintaining a low center of gravity with close proximity to the safety seat base and the vehicle seat bottom as it moves between an upright sitting position and a reclined sleeping position and any desired position inbetween.

The bottom of the child safety seat pivots forward rolling in an essentially horizontal slot, preferably straight across or possibly angled slightly or slightly curved, to make room for the top back of the child safety seat to move downwardly while maintaining a close proximity to the vehicle seat back and maintaining a low center of gravity of the child safety seat in the base.

The reclinable child safety seat can be operated manually or accommodate a motorized version with a motor means, similar to applicant's prior patent applications, to move the pivotable child safety seat between a reclining position and an upright position. A remote control, wired or wireless, for the motor may be used for automatically and remotely controlling the position of the child car safety seat to adjust it between an upright position and a reclined position.

The bottom portion of the child car safety seat encloses the moving mechanisms and is also provided with a pair of openings, one on each side of the back edge of the bottom portion to admit the car seat belt therethrough and secure the child car safety seat in the back seat of the car.

An advantage of the present invention is that it provides a reclining safety seat which maintains close proximity with the vehicle seat back and bottom for the entire range of reclining and inclining positions in accordance with state laws without having to move the child safety seat forward or recline the vehicle seat.

A related advantage of the present invention is that it maintains a low center of gravity of the child safety seat for greater stability and safety.

Another advantage of the present invention is that it safely conceals all of the moving parts within the housing of the base and seat so that the child will never get anything stuck in the moving works of the reclinable seat.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
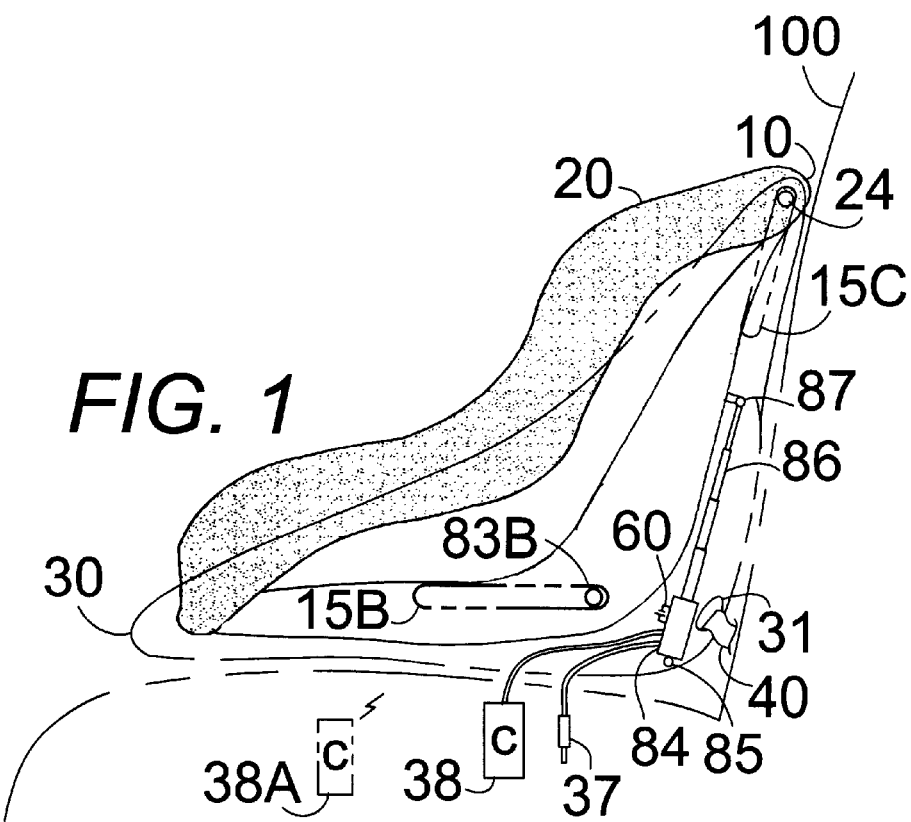
FIG. 1 is a side elevational view of the preferred embodiment of the invention showing the seat supported by the base (shown in dashed lines) with a single bottom sliding groove in the base receiving a pivotable post from the seat sliding in the groove and a top base groove with a pivot from the seat sliding in the base groove, and including a motorized drive and remote control, with the seat in the upright position.
Figure 2:
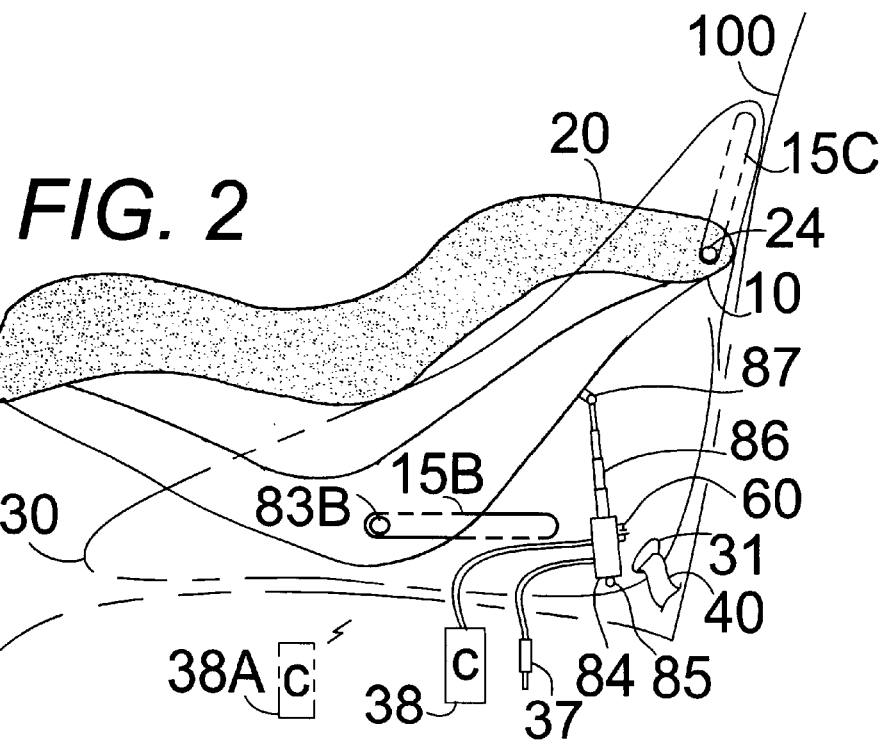
FIG. 2 is a side elevational view of the embodiment of FIG. 1 with the seat in the reclined position.
Figure 3:
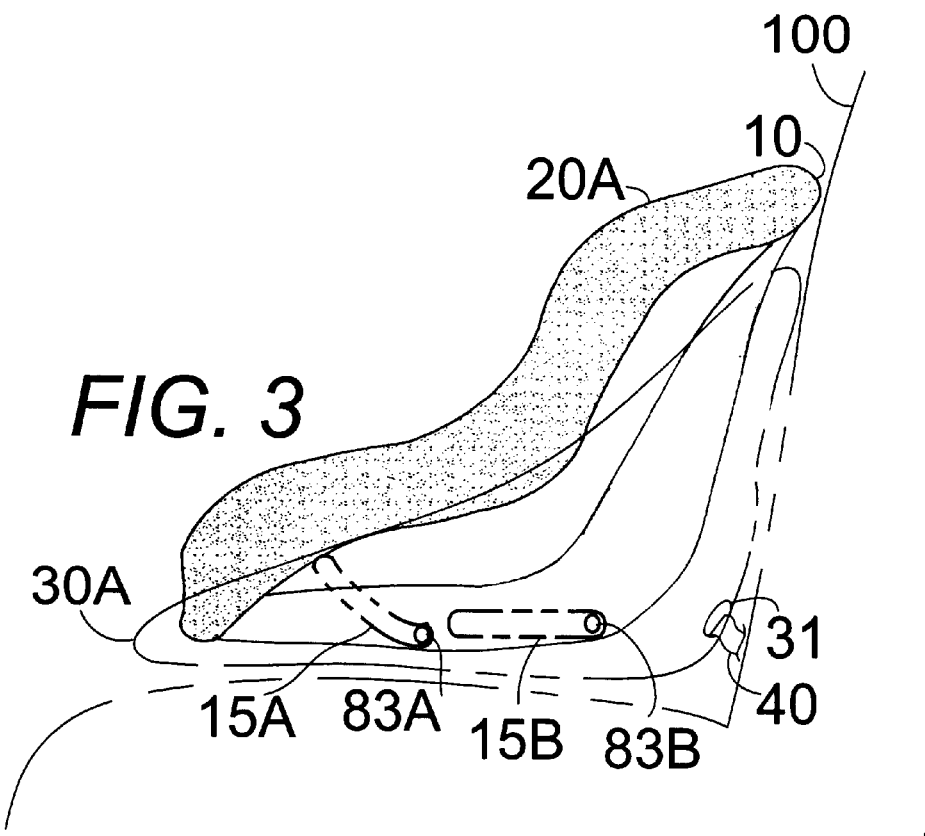
FIG. 3 is a side elevational view of an alternate embodiment of the invention showing the seat supported by the base (shown in dashed lines) with a pair of bottom arched sliding grooves in the base receiving pivotable posts from the seat sliding in the grooves, with the seat in the upright position.
Figure 4:
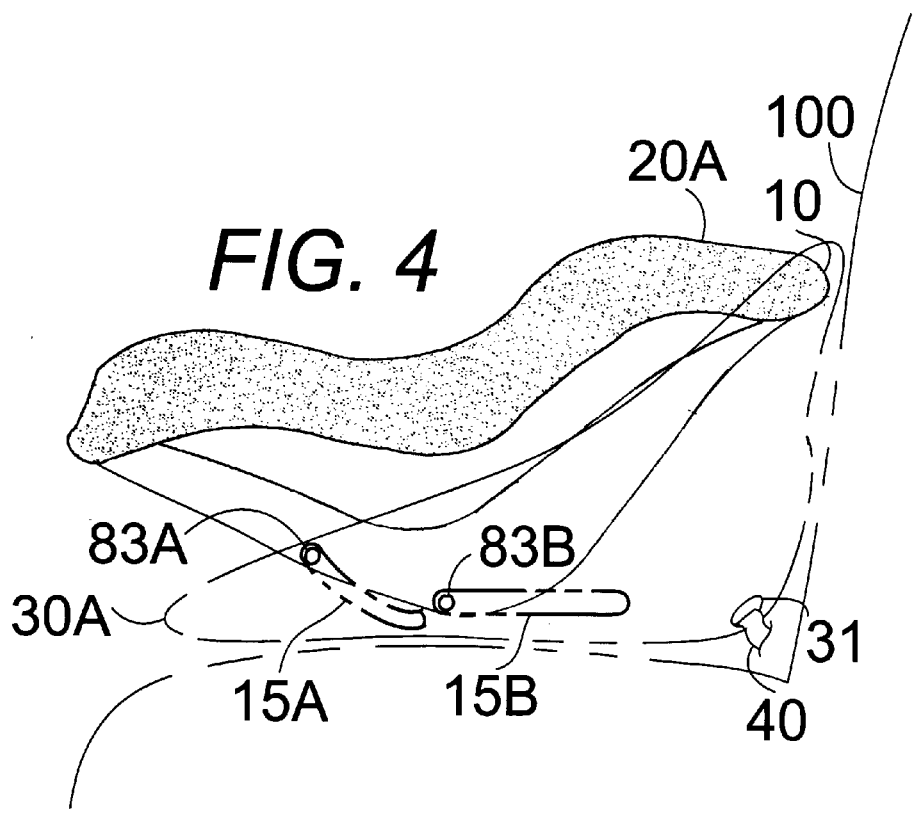
FIG. 4 is a side elevational view of the embodiment of the invention of FIG. 3 with the seat in the reclined position.
Figure 5:
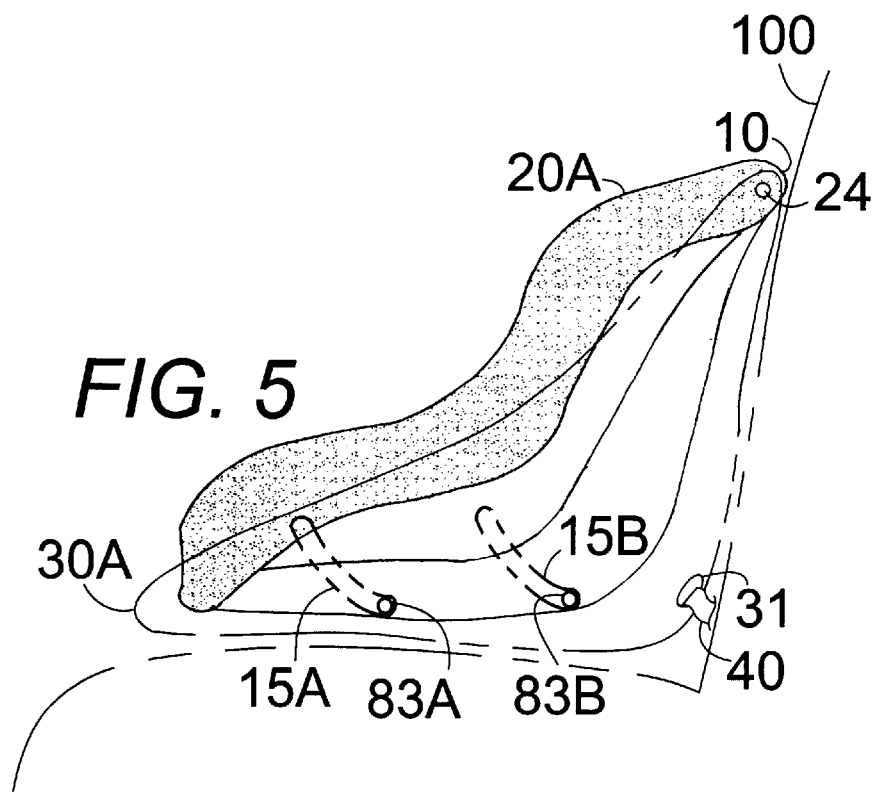
FIG. 5 is a side elevational view of an alternate embodiment of the invention showing the seat supported by the base (shown in dashed lines) with a pair of bottom arched sliding grooves in the base receiving pivotable posts from the seat sliding in the grooves and a top pivot point between the seat and the base, with the sat in the upright position.
Figure 6:
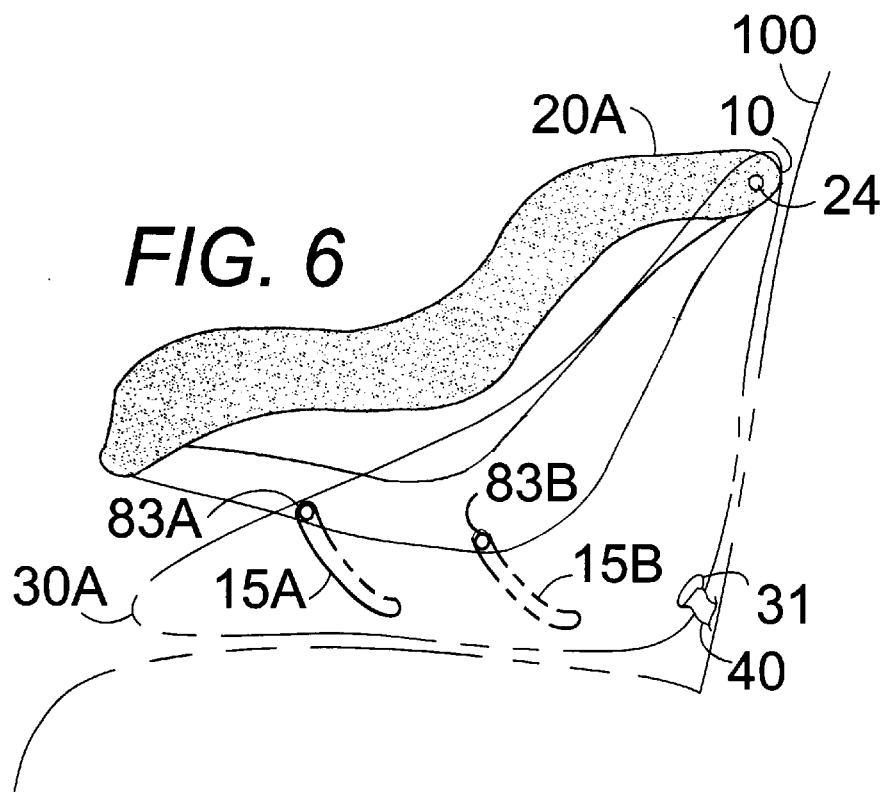
FIG. 6 is a side elevational view of the embodiment of FIG. 5 with the seat in the reclined position.

In FIGS. 1–6, a pivotable reclining child safety seat 20 and 20A for a vehicle maintains close proximity with the vehicle seat back 100 in all positions from an upright sitting position, as in FIGS. 1, 3, and 5, to a reclined sleeping position, as in FIGS. 2, 4, and 6.

The safety seat 20 and 20A is formed of a sturdy molded material into a shell, capable of supporting a child therein. The safety seat is pivotally attached to a base 30 and 30A formed of sturdy molded material mating with the safety seat and capable of supporting the safety seat and allowing relative motion therebetween.

The base has at least one groove means, and preferably two spaced grooves 15A and 15B in the base on each side of the seat. At least one and preferably two pivotable protrusion means, such as pivot arms 83A and 83B, which are preferably provided with wheels, extend out from each side of the seat 20A and 20 and slide in each of the grooves 15A and 15B respectively for interconnecting the child safety seat and the base so the child safety seat is capable of moving through a range of positions from an upright sitting position to a reclined sleeping position and the top 10 of the safety seat back is capable of maintaining close proximity with a vehicle seat back 10 over the full range of positions. By providing a primarily horizontal groove 15B, as shown in FIGS. 1–4, as the primary pivoting groove and one or more stabilizing grooves, such as grooves 15A and 15C, the child safety seat 20 and 20 A maintains a low center of gravity for greater stability and safety, as seen in FIGS. 1–4.

In FIGS. 1 and 2 a preferred embodiment of the pivotable reclining child safety seat 20 is provided with a single bottom seat pivot arm 83B extending from each side of the seat bottom and a single slot 15B, within which the pivot arm pivots as the primary pivot point of the movement. The slot 15B in the base which may be straight or curved depending on the requirements to keep the top 10 of the safety seat in close proximity with the vehicle seat back 100 and is preferably primarily horizontal to maintain the low center of gravity with the safety seat bottom maintained in close proximity to the base bottom and bottom of the vehicle seat. A top pivot arm 24 extends from each side of the top 10 of the safety seat 20 slidably engaged in a slot 15C in the base 30 for stabilizing the pivoting, which is a slot basically oriented parallel to the vehicle seat back 100 to maintain the top 10 of the safety in close proximity to the vehicle seat back 100 throughout the range of motion of the safety seat.

This embodiment of FIGS. 1 and 2 may further comprise a motorized drive means, housed within the pair of molded hollow shells of the base 30 and the seat 20, comprising at least one motor 84 and at least one reversible drive means, such as a telescoping hydraulic reversible drive 86, interconnecting the safety seat 20 and the base 30 capable of moving the safety seat between an upright sitting position, as seen in FIG. 1, and a reclined sleeping position, as seen in FIG. 2.

While the motor is shown attached to the base 30 and attached to the back of the safety seat 20, the motor could be attached to the safety seat 20 and could be positioned either at the back of the safety seat or the front of the safety seat 20.

A motor pivot 85 may connect the motor 84 to the base 30 and a drive pivot 87 connect the drive 86 to the seat 20, although if the motor and drive are positioned vertically the pivots will not be necessary.

The pivotable reclining child safety seat of FIGS. 1 and 2 further comprises a remote control means 38 or 38A for the at least one motor 84, which could be two motors, with one on each side of the seat. The remote control means may be a remote control 38 wired to the motor 84 or a wireless remote control 38A which transmits wireless signals to control the motor 84.

In FIGS. 3 and 4, the groove means comprises a pair of grooves 15A and 15B on each side of the base opposite the base of the seat 30A, the first primary pivot groove 15B being essentially horizontal so that the safety seat maintains a low center of gravity, and the other stabilizing groove 15A curving upwardly at an angle to cause the top 10 of the safety seat back to stay in close proximity with the vehicle seat back 100 and with the bottom of the base 30A and the vehicle seat bottom as the safety seat moves between an upright sitting position, in FIG. 3, and a reclined sleeping position, in FIG. 4 as the pivot arms 83A and 83B slide in the grooves 15A and 15B respectively.

In FIGS. 5 and 6 the pivotable reclining child safety seat further comprises a top seat pivot arm 24 protruding from each side of the top of the safety seat 20A mating with an opening in the base on each side so that the safety seat pivots around the top seat pivot are 24 while the bottom pivot arms 15A and 15B slide in the grooves 83A and 83B moving the safety seat between an upright sitting position, in FIG. 5, and a reclined sleeping position, in FIG. 6, with the top 10 of the safety seat remaining in close proximity with the vehicle seat back 100.

It is understood that the preceding description is given merely by way of illustration and not in limitation of the invention and that various modifications may be made thereto without departing from the spirit of the invention as claimed.

What is claimed is:

1. A pivotable reclining child safety seat for a vehicle, which child safety seat maintains close proximity with the vehicle seat back and a low center of gravity in all positions, the child safety seat comprising:

a safety seat adapted for reclining and capable of supporting a child therein;

a base of adapted for supporting the safety seat and allowing relative motion therebetween;

at least one groove means in the base on each side of the seat and a pivotable protrusion means from the seat in each of the groove means for interconnecting the child safety seat and the base so the child safety seat adapted for moving through a range of positions from an upright sitting position to a reclined sleeping position and is adapted for maintaining close proximity with a vehicle seat back in the full range of positions, the at least one groove means being horizontally oriented to maintain the safety seat with a low center of gravity;

wherein the safety seat and the base are formed as a mating pair of molded hollow shells and the groove means and pivotable protrusion means are housed within the hollow shells; and a motorized drive means, housed within the pair of molded hollow shells comprising at least one motor and at least one reversible drive means interconnecting the safety seat and the base adapted for moving the safety seat.

2. The pivotable reclining child safety seat of claim 1 wherein the groove means comprise a pair of grooves on each side of the base and the pivotable protrusion means comprises a pair of pivotable arms extending from each side of the safety seat with one of the pair of pivotable arms in each of the pair of grooves, the pair of grooves configured so that the pivotable arms are adapted for sliding within the grooves moving the safety seat through the full range of positions while maintaining the seat back in close proximity with the vehicle seat back and maintaining a low center of gravity.

3. The pivotably reclining child safety seat of claim 2 wherein the pivotable arms each further comprise a rotatable wheel for rolling in the grooves.

4. The pivotable reclining child safety seat of claim 2 further comprising a seat pivot arm adjacent to a top of the seat on each side of the safety seat and a base means for pivotally receiving the seat pivot arm on each side of the base.

5. The pivotable reclining child safety seat of claim 4 wherein the base means for pivotally receiving the seat pivot arm comprises a slot on each side of the base adapted for receiving the seat pivot arm slidably therein.

6. The pivotable reclining child safety seat of claim 1 wherein the reversible drive means comprises a motor housed within the base and connected to one of the shells and the motor drives a driving arm connected to the other of the shells to pivot the safety seat reversibly between a reclined position and an upright sitting position.

7. The pivotable reclining child safety seat of claim 6 wherein the driving arm comprises a telescoping hydraulic drive arm.

8. The pivotable reclining child safety seat of claim 6 further comprising a remote control means for the at least one motor.

9. The pivotable reclining child safety seat of claim 8 wherein the remote control means is a remote control wired to the at least one motor.

10. The pivotable reclining child safety seat of claim 8 wherein the remote control means is a wireless remote control which transmits wireless signals to control the at least one motor.

* * * * *